April 24, 1962     A. R. HAMILTON     3,031,610
TEMPERATURE CONTROL CIRCUIT
Filed Aug. 6, 1956     2 Sheets-Sheet 1

INVENTOR.
ALLEN R. HAMILTON
BY
Christie, Parker & Hale
ATTORNEYS

INVENTOR.
ALLEN R. HAMILTON

United States Patent Office 3,031,610
Patented Apr. 24, 1962

3,031,610
TEMPERATURE CONTROL CIRCUIT
Allen R. Hamilton, Rochester, N.Y., assignor, by mesne assignments, to Consolidated Vacuum Corporation, Rochester, N.Y., a corporation of New York
Filed Aug. 6, 1956, Ser. No. 602,292
6 Claims. (Cl. 323—66)

This invention relates to an automatic control circuit in which a resistor is maintained at a substantially constant resistance and temperature.

An important application for the circuit of this invention is in Pirani vacuum gauges. Such gauges are well-known and are described in the text book, "Vacuum Technique," by Dushman, published by John Wiley and Sons, Inc., New York, second printing, August 1949, pages 318 through 330.

A Pirani vacuum gauge operates on the principle that the heat conductivity of a gas decreases with the gas pressure. Ordinarily, a sensing element, such as a wire resistor with a high temperature coefficient of resistance, is surrounded by the gas whose pressure is to be measured. The wire resistor is connected in a circuit adapted to supply current to the resistor and heat it above the temperature of the ambient gas. The rate at which the wire loses heat to the gas is a function of the gas pressure and can be measured by any of the following procedures:

(1) The voltage on the wire is maintained constant, and the change in current is observed as a function of the pressure.

(2) The resistance (and consequently the temperature) of the wire is maintained constant, and the energy input required for this is observed as a function of the pressure.

(3) The current is maintained constant, and the change in resistance is observed as a function of the pressure.

The circuit of this invention is applicable to the type of Pirani gauge in which the resistance, and consequently the temperature, of the sensitive element is maintained constant, and the energy input required is observed as a function of the gas pressure around the sensing element.

One of the disadvantages of present Pirani gauges is their limited range of usefulness. For example, present Pirani gauges are limited to an operating range from about $10^{-5}$ mm. Hg to about 1 mm. Hg. This invention provides a circuit which permits the operating range of a Pirani gauge to be extended to above 10 mm. Hg.

According to Ohm's law, the resistance of a resistor is determined by the following equation:

$$R = E/I$$

in which:
R is resistance of the resistor,
E is voltage drop across the resistor, and
I is the current flowing through the resistor.

This invention provides a circuit in which the ratio $E/I$ in a resistor is automatically maintained substantially constant to keep the resistance and temperature of the resistor substantially constant, and thereby provides a sensitive element for use in a Pirani gauge which will accurately measure gas pressures in the range from about .1 mm. Hg to about 15 mm. Hg. Thus, the circuit of this invention is ideally suited to be combined with the conventional Pirani circuits which are useful in the lower pressure range mentioned above.

Briefly, the invention contemplates an automatic control circuit which includes a resistor adapted to be connected to a source of current. The circuit also includes means responsive to current passing through the resistor and to the voltage drop across the resistor for changing the current through the resistor to maintain the ratio of current through the resistor to voltage across the resistor substantially constant, and thereby maintain the resistor at a substantially constant temperature.

In the preferred form of the invention, the circuit includes a saturable reactor and means responsive to the current through the resistor for generating a magnetic flux through the reactor in one direction. Also provided are means responsive to the voltage drop across the resistor for generating a magnetic flux through the reactor in an opposite direction. Means are provided which are responsive to the flux in the reactor for controlling the current through the resistor so that the current through the resistor is regulated to maintain the resistor at a substantially constant temperature.

These, and other aspects of the invention will be more fully understood from the following detailed description taken in conjunction with the accompanying drawing, in which.

Figure 1:
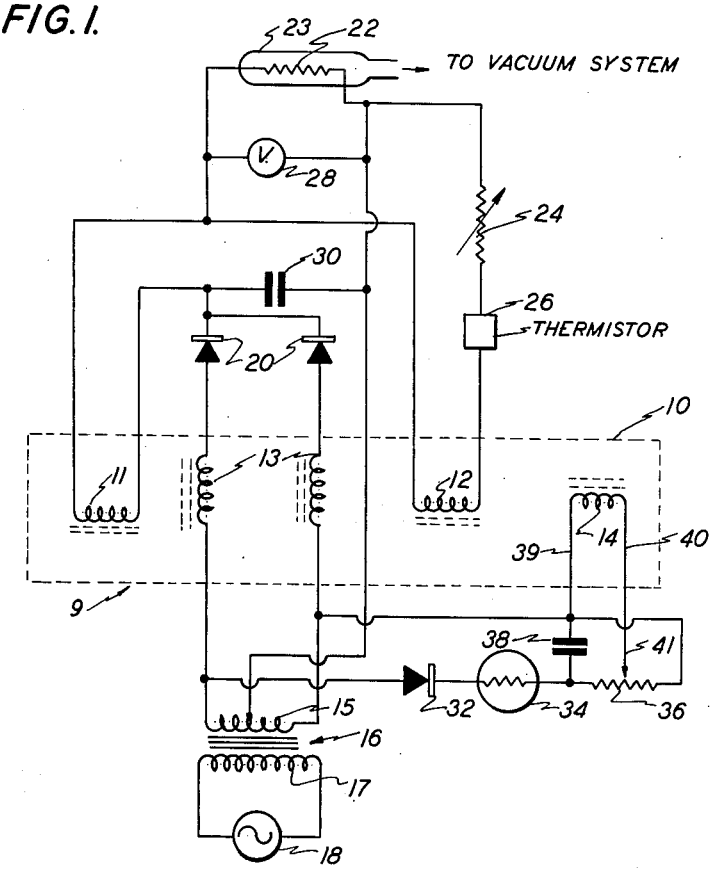
FIG. 1 is a schematic circuit diagram of the presently preferred embodiment of the invention.

Referring to FIG. 1, the circuit includes a magnetic amplifier 9 which has a saturable reactor 10, a current control winding 11, a voltage control winding 12, a pair of load windings 13 and a bias winding 14. The load windings are connected to the opposite ends of a center-tapped secondary winding 15 of a transformer 16 having a primary winding 17, which is supplied power from a suitable alternating current source 18. Each of the load windings feeds into a separate respective dry-disk type rectifier 20 to supply power to a sensing resistor 22 which is connected in series with the current control winding. The resistor is surrounded by an envelope 23 which is adapted to be connected to a vacuum system (not shown). The voltage control winding is connected across the sensing resistor to be responsive to the voltage drop through the resistor, and a calibrating variable resistor 24 and a thermistor 26 are in series with the voltage control winding. A voltmeter 28 is also connected across the sensing resistor. A capacitor 30 is connected in parallel with the current control winding and the sensing resistor to smooth the flow of current through these elements.

The bias coil is supplied direct current from a D.C. source, which includes a rectifier 32, a current regulator 34 and a resistor 36 connected in series across the secondary winding of the transformer. A smoothing capacitor 38 is connected across the resistor 36. The bias coil takes its current through a lead 39 connected to one end of the resistor 36, and through another lead 40 connected to a sliding contact 41 adapted to move along the resistor 36.

For normal operating conditions, the control windings are designed to provide an equal and opposite number of ampere-turns in the saturable reactor, so that when the resistor is at the desired temperature, the flux generated by the control windings is cancelled. The bias winding is wound on the saturable reactor in a direction to aid the flux of the current control winding and to oppose the flux of voltage control winding.

Figure 2:
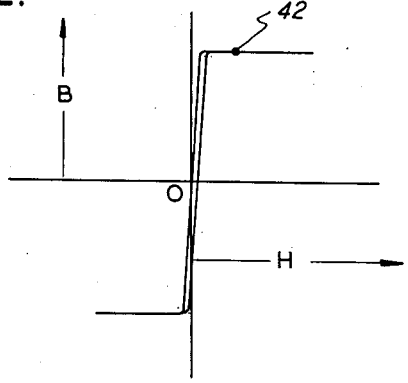
FIG. 2 is a curve showing the operating characteristics of the saturable reactor of FIG. 1.

FIG. 2 shows the permeability characteristic of the saturable reactor in a conventional plot of magnetic flux density (B) as the ordinate and magnetizing force (H) as the abscissa. Using the regulated bias supply, the saturable reactor is set to a level of saturation as indicated at a point 42 of the B—H curve of FIG. 2. The calibrating variable resistor is set to bring the two control windings into cancellation and maintain the sensing resistor at a suitable temperature, say 142° C., when exposed to atmospheric pressure.

As long as the sensing resistor remains at the desired temperature, the magnetic flux generated by the control coils is cancelled, and the saturable reactor remains at the degree of saturation indicated by point 42 of FIG. 2. In this condition, the saturable reactor has a low permeability and offers little impedance to the flow of current through the load windings to the sensing resistor.

As the pressure around the sensing resistor is reduced, the temperature of the resistor tends to increase due to less heat loss from the resistor to the surrounding gas. The resistor may be of any suitable material, but preferably it is of material which has a high thermal coefficient of resistance, such as tungsten, so that as its temperature tends to increase, its resistance also tends to increase by a significant amount. This causes current through the current control winding to decrease, causing flux in the saturable reactor to decrease. At the same time, since the voltage regulation is poor, the voltage across the sensing resistor and the current in the voltage control winding 12 increases. Since the voltage control winding is opposed to that of the current control winding, it further decreases the flux in the saturable reactor. Thus, the core is no longer operating in the saturated region, and offers considerable impedance to the flow of current through the load windings. The reduced load current causes the sensing resistor to cool, and also very nearly restores the balance between the control windings so that the resistor is maintained at substantially the original resistance and temperature.

The amount of current flowing through the voltage control winding varies over a wide range in the operation of the circuit, and the thermistor, which has a large negative thermal coefficient of resistivity, compensates for the variation in temperature of this control winding.

The operation of the circuit is enhanced if the design of the magnetic amplifier is such that its gain is large, say 30,000 to 50,000. The performance of the circuit is also improved by making the voltage drop through the currrent control winding small compared with the voltage drop through the sensing resistor, and by keeping the current drawn by the voltage control winding small compared with the current through the sensing resistor.

The gas pressure surrounding the sensing resistor can be measured in several different ways. For example, it is a function of the voltage across the sensing resistor, the current through the resistor, and the alternating flux in the saturable reactor, which may be monitored by a meter connected to a pick-up coil.

Figure 3:
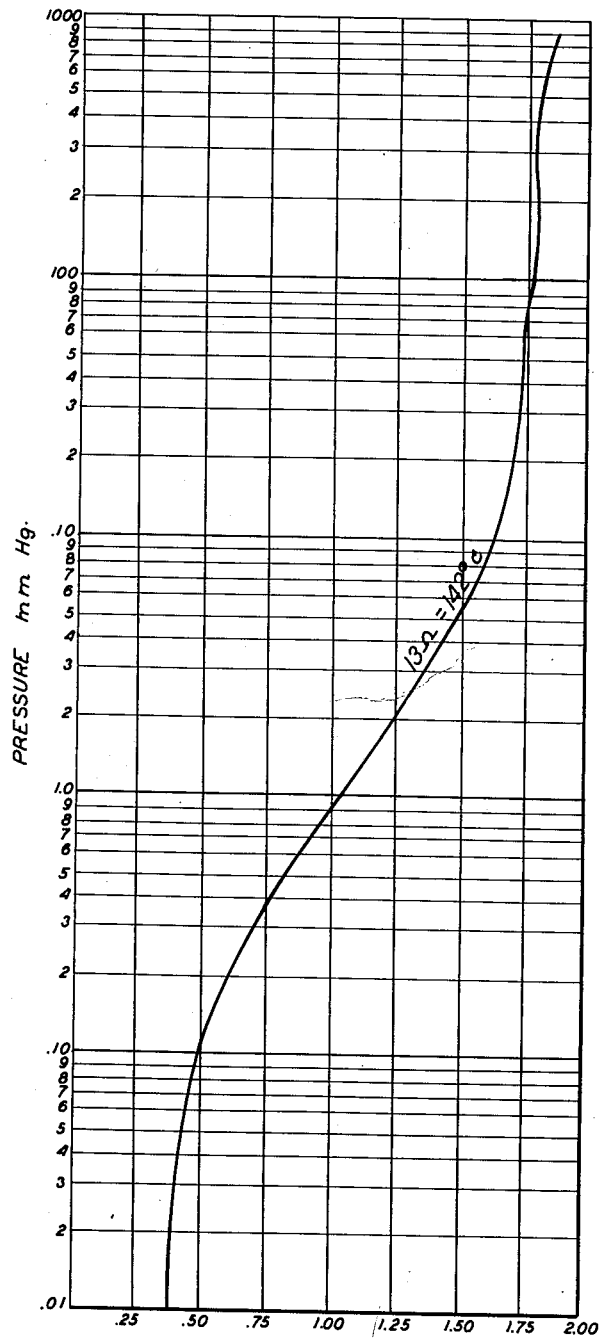
FIG. 3 is a graph showing the operating range of a Pirani gauge using the circuit of this invention.

In the presently preferred form of the invention, the gas pressure is measured by means of the voltmeter 28 connected across the sensing resistor. FIG. 3 is a plot of the voltage across the sensing resistor against the pressure of air surrounding the resistor, using the circuit of this invention.

The curve of FIG. 3 was obtained using a tungsten filament as a sensing resistor. Prior to use in the circuit, the filament had its surface blackened by heating to a red heat in air. The filament was held in a horizontal position during the measurement and had a resistance of 8.75 ohms at 27° C.

As can be seen from the curve of FIG. 3, the change in voltage with change in pressure is sufficiently high in the region from about .1 mm. Hg to about 15 mm. Hg to provide an accurate measurement of the pressure. Below about .1 mm. Hg, the curve is so steep that it is preferable to switch the resistor to a conventional constant voltage bridge circuit for measuring pressures below this value, using the magnetic amplifier as a voltage regulator power supply for the bridge.

The curve shows that the circuit provides a Pirani gauge element which is useful well above the upper limit of 1 mm. Hg, which exists for current Pirani gauges. The curve of FIG. 3 may be used with considerable accuracy up to 15 mm. Hg, and is of at least qualitative use for pressures well above 15 mm. Hg.

I claim:

1. An automatic control circuit which comprises a temperature-sensitive resistor adapted to be connected to a source of direct current, a saturable reactor, means responsive to the current through the resistor for generating a magnetic flux through the reactor in one direction, means responsive to the voltage drop across the resistor for generating a magnetic flux through the reactor in the opposite direction, and means responsive to the flux in the reactor for controlling the current through the resistor to maintain the temperature of the resistor substantially constant and therefore the ratio of current through the resistor to the voltage across the resistor substantially constant.

2. An automatic control circuit which comprises a temperature-sensitive resistor adapted to be connected to a source of direct current, a saturable reactor, a current control winding responsive to the current through the resistor for generating a magnetic flux through the reactor in one direction, a voltage control winding responsive to the voltage drop across the resistor for generating a magnetic flux through the reactor in the opposite direction, and a load winding responsive to the flux in the reactor for controlling the current through the resistor to maintain the temperature of the resistor substantially constant and therefore the ratio of current through the resistor to the voltage across the resistor substantially constant.

3. An automatic control circuit which comprises a temperature-sensitive resistor adapted to be connected to a source of current, a saturable reactor, a current control winding in series with the resistor and responsive to the current through the resistor for generating a magnetic flux through the reactor in one direction, a voltage control winding in parallel with the resistor and responsive to the voltage drop across the resistor for generating a magnetic flux through the reactor in the opposite direction, a capacitor in parallel with the current control winding and the resistor, and means responsive to the flux in the reactor for controlling the current through the resistor to maintain the ratio of the current passing through the resistor to the voltage across the resistor substantially constant.

4. An automatic control circuit which comprises a sensing resistor having a high thermal coefficient of resistance adapted to be connected to a source of power, a saturable reactor, a current control winding responsive to the current through the resistor for generating a magnetic flux through the reactor in one direction, a voltage control winding responsive to the voltage drop across the resistor for generating a magnetic flux through the reactor in the opposite direction, a local winding responsive to the flux in the reactor for controlling the current through the resistor to maintain the ratio of the current through the resistor to the voltage across the resistor substantially constant and means for sensing the power dissipated in the resistor.

5. In a vacuum gauge circuit the combination which comprises a sensing resistor adapted to be exposed to a gas the pressure of which is to be measured, the sensing resistor having a high thermal coefficient of resistance and adapted to be connected to a source of power, a saturable reactor, a current control winding connected in series with the resistor and responsive to the current through the resistor for generating a magnetic flux through the reactor in one direction, a voltage control winding connected in parallel with the resistor and responsive to the voltage drop across the resistor for generating a magnetic flux through the reactor in the opposite direction, means responsive to the flux in the reactor for controlling the current through the sensing resistor, the current control winding, the voltage control winding and the last-named means being arranged to maintain the ratio of current through the resistor to the voltage across the resistor substantially constant and thereby the temperature of the resistor substantially constant and means responsive to the voltage across the resistor for establishing a signal representative of the pressure of the gas to which the resistor is exposed.

6. The combination as defined in claim 5 including a capacitor connected in parallel with the current control winding, a thermistor connected in series with the voltage control winding, a bias winding for generating a magnetic flux in the reactor and means for adjusting the flux generated by the bias winding.

References Cited in the file of this patent

UNITED STATES PATENTS

| | | |
|---|---|---|
| 2,086,120 | Croden | July 6, 1937 |
| 2,386,903 | Lutomirski | Oct. 16, 1945 |
| 2,455,869 | Krabbe | Dec. 7, 1948 |
| 2,503,880 | Mah | Apr. 11, 1950 |
| 2,549,782 | Engelman | Apr. 24, 1951 |
| 2,634,394 | Kohler | Apr. 7, 1953 |
| 2,707,262 | Walker | Apr. 26, 1955 |
| 2,733,403 | Arvidsson | Jan. 31, 1956 |
| 2,769,076 | Bogdan | Oct. 30, 1956 |
| 2,798,196 | Hage | July 2, 1957 |
| 2,938,397 | Hamilton | May 31, 1960 |